(12) United States Patent
Nagashima et al.

(10) Patent No.: US 8,396,060 B2
(45) Date of Patent: Mar. 12, 2013

(54) NETWORK CONTROL SYSTEM

(75) Inventors: Akira Nagashima, Tokyo (JP); Tetsuya Ohtani, Tokyo (JP); Ryutaro Okano, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 238 days.

(21) Appl. No.: 12/740,175

(22) PCT Filed: Sep. 29, 2008

(86) PCT No.: PCT/JP2008/067681
§ 371 (c)(1),
(2), (4) Date: Jul. 9, 2010

(87) PCT Pub. No.: WO2009/057403
PCT Pub. Date: May 7, 2009

(65) Prior Publication Data
US 2011/0044331 A1   Feb. 24, 2011

(30) Foreign Application Priority Data

Oct. 29, 2007   (JP) .............................. P2007-280543

(51) Int. Cl.
*H04L 12/28*   (2006.01)
(52) U.S. Cl. ...................................... 370/389
(58) Field of Classification Search .................. 370/225, 370/389, 428, 429
See application file for complete search history.

(56) References Cited

U.S. PATENT DOCUMENTS 6,047,222 A    4/2000   Burns et al.
7,311,665 B2 * 12/2007  Hawthorne et al. ........... 600/300

FOREIGN PATENT DOCUMENTS

| JP | 564902 U | 8/1993 |
|---|---|---|
| JP | 8-328650 A | 12/1996 |
| JP | 11-345003 A | 12/1999 |
| JP | 2000-311016 A | 11/2000 |
| JP | 2002-040917 A | 2/2002 |
| JP | 2006-221558 A | 8/2006 |
| JP | 2006-277306 A | 10/2006 |
| JP | 3874785 B1 | 11/2006 |
| JP | 2007-233891 A | 9/2007 |

OTHER PUBLICATIONS

Japanese Office Action issued on Nov. 28, 2011 in the corresponding Japanese Patent Application No. 2007-280543.

(Continued)

*Primary Examiner* — Man Phan
*Assistant Examiner* — Nourali Mansoury
(74) *Attorney, Agent, or Firm* — Sughrue Mion, PLLC

(57) ABSTRACT

A network control system for packet-transmitting a manipulated variable (MV), calculated from a deviation between a variable from a sensor measuring a physical quantity of a controlled object plant and a set value at a known sampling period, to an actuator provided on the plant side via a network, and causing the actuator to provide the MV to the plant. The system includes: an MV complementing unit that provides a complementary value of the MV to the actuator when an error occurs in a packet transmission; an MV buffering unit that answers back trend data of the MV provided to the plant from the actuator or the complementary value being complemented by the MV compensating unit for the actuator, to the controller via the network; and an MV compensating unit that corrects a calculation of the MV of the controller based on the trend data or the complementary value being answered.

5 Claims, 7 Drawing Sheets

OTHER PUBLICATIONS

International Search Report (PCT/ISA/210) for PCT/JP2008/067681, dated Dec. 16, 2008.

International Preliminary Report on Patentability (PCT/ISA/237) for PCT/JP2008/067681, dated Dec. 16, 2008.

Extended European Search Report issued in corresponding European Application No. 08843842.9 on Nov. 8, 2011.

* cited by examiner

NETWORK CONTROL SYSTEM

This is a National Stage of International Application No. PCT/JP2008/067681, filed on Sept. 29, 2008, which claims priority from Japanese application No. 2007-280543, filed on Oct. 29, 2007. The content of these applications are incorporated herein in their entirety by reference.

TECHNICAL FIELD

The present invention relates to a network control system for packet-transmitting a manipulated variable (referred to as "MV" hereinafter) of a controller, which is calculated based on a deviation between a processed variable (referred to as "PV" hereinafter) from a sensor that measures a physical quantity of a controlled object plant and a set value (abbreviated to "SV" hereinafter) at a predetermined sampling period, to an actuator provided on the controlled object plant side via a network, and causing the actuator to provide the MV to the controlled object plant.

BACKGROUND ART

The trend of plant control is directed toward the networked control using a wireless communication or the like in the future. In the networked control, a packet transmission error that the PV or the MV does not reach a destination from a sender due to aggravation of communication circumstances, i.e., a packet loss, occurs. In the network control system, a compensation algorithm for a packet loss is demanded.

FIG. 8 is a functional block diagram showing a configurative example of the network control system in the prior art. As a basic configuration, a plant side 10 and a controller side 20 are connected mutually via a network 30.

The PV is transmitted from a sensor 12, which measures a physical quantity of a controlled object plant 11 on the plant side 10, to a controller 21 on the controller side 20 via the network 30. The controller 21 calculates a deviation between the transmitted PV and the set SV, e.g., a "proportional-intergral-derivative" or PID-operated MV, and transmits this MV to an actuator 13 on the plant side 10 via the network 30. The actuator 13 provides the received MV to the controlled object plant 11.

When the controller 21 cannot receive the PV due to the packet loss, the controller 21 compensates for the PV required for the MV calculation by a PV complementary value provided by a PV complementing unit 22. Similarly, when the actuator 13 cannot receive the PV due to the packet loss, the actuator 13 compensates for the MV, which is to be provided to the controlled object plant 11, by an MV complementary value provided by an MV complementing unit 14.

As the PV complementary value and the MV complementary value, the latest PV and MV values received in the sampling period immediately before the packet loss occurs or the estimated values calculated based on trend data in predetermined sampling periods are employed.

Patent Document 1: JP-A-08-328650
Patent Document 2: JP-A-11-345003
Patent Document 3: JP-A-2002-040917
Patent Document 4: JP-A-2006-277306
Patent Document 5: JP-A-2007-233891

DISCLOSURE OF THE INVENTION

Problems that the Invention is to Solve

In the network control system having the conventional configuration, the trouble caused due to an occurrence of the packet loss that the PV or the MV does not reach the destination from the sender depending on the communication circumstances is not fully taken into account. Therefore, the serious problems described hereunder arise in the plant control at a time of occurrence of the packet loss.

In the case where either the MV that the controller 21 calculates on account of the packet loss and the MV that is provided actually to the controlled object plant 11 are different or the actual PV and the PV that is complemented by the PV complementing unit are different, an internal state of the controller gets out of order and thus a response is deteriorated.

FIG. 9 is a characteristic view showing deterioration in a response characteristic when a packet loss occurs. The MV that the controller 21 calculates when the packet loss occurs and the MV that is provided actually into the controlled object plant 11 are different, and a response is deteriorated. In this example, the responses are given when the SV is changed from 20 to 40. Here, a solid line indicates the characteristic when no loss occurs, and a dot-dash line indicates the characteristic when the actuator 13 cannot receive the MV due to the packet loss at a time of changing the set value.

When the SV is changed, the controller 21 calculates the MV in response to the change. In this event, since the actuator 13 cannot receive the MV that is calculated in the controller 21 upon changing the set value, a start of the response of PV is delayed in the response indicated with a dot-dash line.

In this case, the controller 21 increases an integrated value indicating its own internal state during a time in which a start of the response of PV is delayed. As a result, the integrated value is excessively largely increased. This excessively largely integrated value must be restored to a proper value.

When the integrated value becomes larger than an appropriate set value, the integrated value cannot be restored to the proper value unless the PV is increased larger than the SV once. Therefore, an overshoot of the PV is increased. With the above, a disturbance of the response is generated.

The present invention has been made to solve the problems, and it is an object of the present invention to implement a network control system capable of realizing stable plant control by compensating a controller in view of an occurrence of a packet loss.

Means for Solving the Problems

In order to solve such problems, the present invention is configured as follows.

(1) A network control system for packet-transmitting a manipulated variable of a controller, which is calculated based on a deviation between a process variable from a sensor that measures a physical quantity of a controlled object plant and a set value at a predetermined sampling period, to an actuator provided on the controlled object plant side via a network, and causing the actuator to provide the manipulated variable to the controlled object plant, the network control system comprising:

an MV complementing unit that provides a complementary value of the manipulated variable to the actuator when an error occurs in a packet transmission;

an MV buffering unit that answers back trend data of the manipulated variable being provided to the controlled object plant from the actuator or the complementary value being complemented by the MV compensating unit for the actuator, to the controller via the network; and an MV compensating unit that corrects a calculation of the manipulated variable of the controller based on the trend data or the complementary value being answered back.

(2) The network control system according to item (1), wherein the MV compensating unit calculates a virtual SV value based on the trend data or the complementary value being answered back and the trend data being held on the controller side, such that an amount of manipulated variable obtained from a sampling at a time of occurrence of an error in the packet transmission to a current sampling coincides with a value of the trend data, and then corrects/calculates the manipulated variable in the controller from the virtual SV value.

(3) The network control system according to item (1), wherein the controller stops temporarily the transmission of the manipulated variable to the actuator until the controller acquires an answer-back of the trend data or the complementary value.

(4) The network control system according to item (1), wherein the controller transmits separately a first manipulated variable corresponding to an amount of change in the set value in a differentiating operation and a second manipulated variable corresponding to an amount of change in the set value except the amount of change in the set value in the differentiating operation, and the MV complementing unit provides a sum of the first manipulated variable and the second manipulated variable to the actuator as the complementary value when the packet transmission is in a normal state, and provides only the second manipulated variable to the actuator as the complementary value when the packet transmission is in an error state.

(5) The network control system according to item (1), wherein when the processed variable measured by the sensor is packet-transmitted to the controller via the network, the network control system further comprises:

a PV complementing unit that provides a complementary value of the processed variable to the controller when an error occurs in the packet transmission; and a PV buffering unit that transmits trend data of the processed variable measured by the sensor to the controller via the network.

(6) The network control system according to item (1), wherein the PV complementing unit corrects the complementary value of the processes variable based on the trend data of the manipulated variable.

Advantages of the Invention

According to the configuration of the present invention, even though such a situation is caused under network control that the actuator cannot receive the MV due to the packet loss, the stable plant control can be carried out by making the MV compensation on the controller side not to largely disturb the plant state.

DESCRIPTION OF REFERENCE NUMERALS AND SIGNS

| | |
|---|---|
| 100 | plant side |
| 101 | controlled object plant |
| 102 | sensor |
| 102a | PV buffering unit |
| 103 | actuator |
| 103a | MV buffering unit |
| 104 | MV complementing unit |
| 200 | controller side |
| 201 | controller |
| 201a | MV buffering unit |
| 201b | PV buffering unit |
| 201c | MV compensating unit |
| 202 | PV complementing unit |
| 202a | process model |
| 300 | network |

BEST MODE FOR CARRYING OUT THE INVENTION

Figure 1:
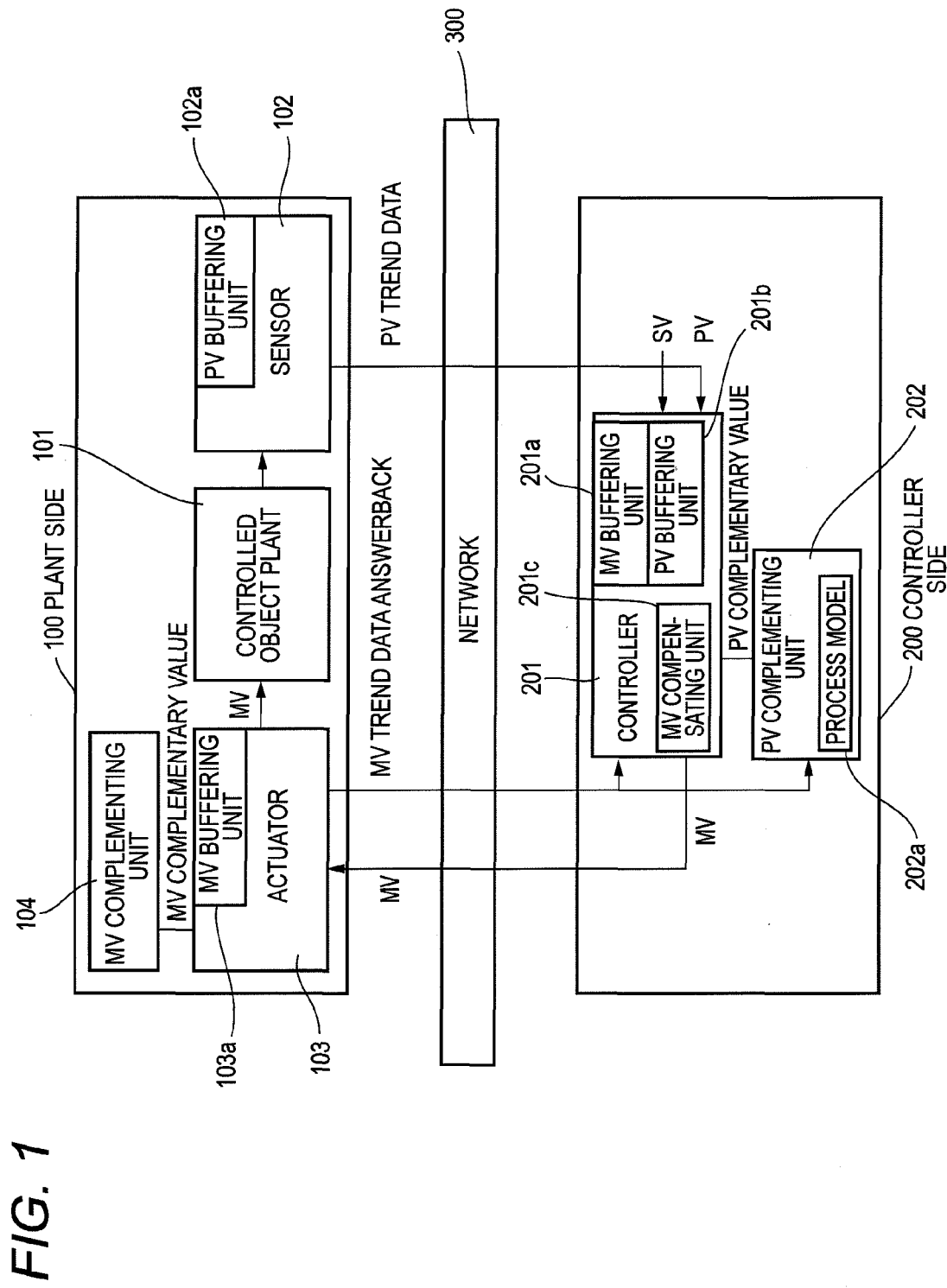
FIG. 1 is a functional block diagram showing an embodiment of a network control system according to the present invention.
Figure 8:
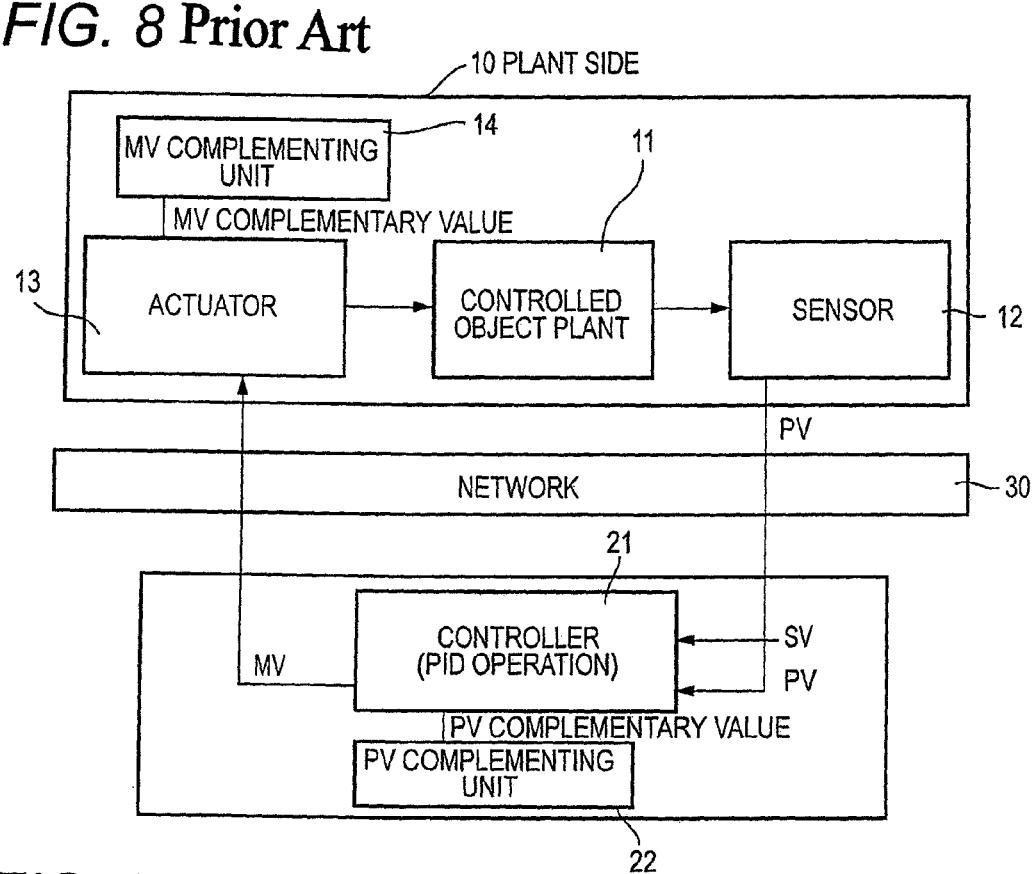
FIG. 8 is a functional block diagram showing yet a configurative example of a network control system in the prior art.
Figure 9:
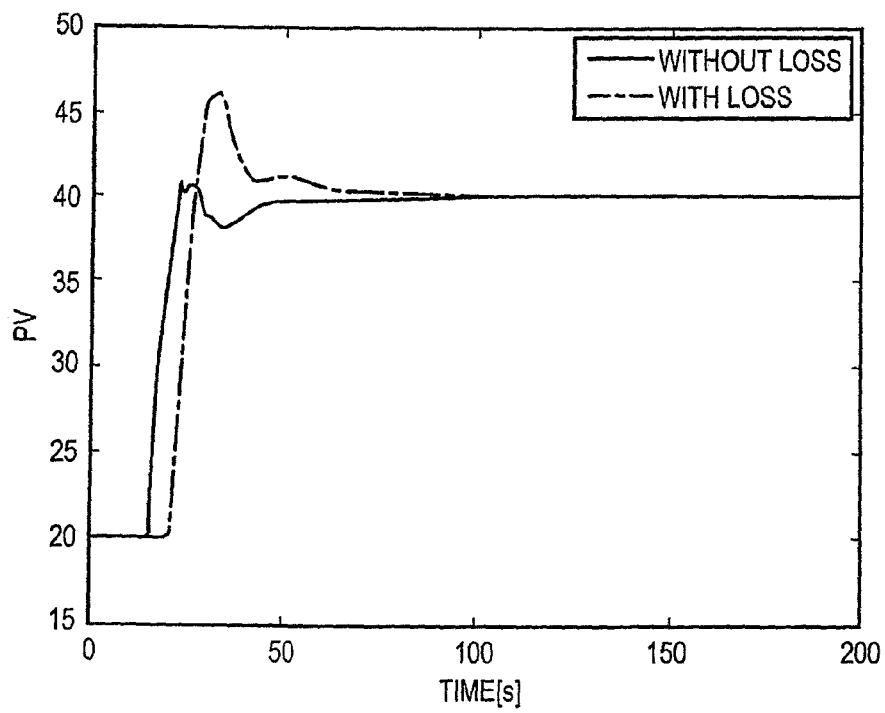
FIG. 9 is a characteristic view showing deterioration in a response characteristic when a packet loss occurs.

The present invention will be explained with reference to the drawings hereinafter. FIG. 1 is a functional block diagram showing an embodiment of a network control system according to the present invention. A basic configuration is identical to that of the conventional system explained in FIG. 8.

The PV is transmitted from a sensor 102, which measures a physical quantity of a controlled object plant 101 on a plant side 100, to a controller 201 on a controller side 200 via a network 300. The controller 201 calculates a deviation between the transmitted PV and the set SV, e.g., PID-operated MV, and transmits this MV to an actuator 103 on the plant side 100 via the network 300. The actuator 103 provides the received MV to the controlled object plant 101.

When the controller 201 cannot receive the PV due to the packet loss, the controller 201 compensates for the PV required for the MV calculation by the PV complementary value provided by a PV complementing unit 202. Similarly, when the actuator 103 cannot receive the MV due to the packet loss, the actuator 103 compensates for the MV, which is to be provided to the controlled object plant 101, by the MV complementary value provided by an MV complementing unit 104.

An MV buffering unit 201a is provided in the controller 201. This MV buffering unit 201a holds trend data having (m+1) pieces of MV information that the controller 201 calculated in respective samplings from the current sampling to the m samplings ahead of this current sampling.

Similarly, an MV buffering unit 103a is provided in the actuator 103. This MV buffering unit 103a holds trend data having (m+1) pieces of MV information that the actuator 103 provides actually to the controlled object plant 101 in respective samplings from the current sampling to the m samplings prior to this current sampling.

The actuator 103 transmits the trend data having (m+1) pieces of information being held in the MV buffering unit 103a to the controller 201 via the network 300 to perform the answerback.

When the actuator 103 cannot receive the MV being transmitted from the controller 201 due to the packet loss, the actuator 103 compensates for the MV by the MV complementary value provided by the MV complementing unit 104. At this time, the MV being provided actually to the controlled object plant 101 is different from the MV that the controller 201 calculated.

This divergence of MV disturbs the internal state of the controller 201, and act as a factor to worsen the subsequent responses. Therefore, the controller 201 compares MV trend data being received by an answerback from the actuator 103 with MV trend data that MV buffering unit 201a itself holds therein. When both trend data are different, the compensating unit 210c performs the compensating operation by utilizing the MV trend data answered-backed, and corrects an internal state of the controller 201.

A PV buffering unit 102a is provided in the sensor 102. This PV buffering unit 102a holds trend data having (m+1) pieces of PV information that the sensor 102 measured in respective samplings from the current sampling to the m samplings prior to this current sampling.

Similarly, a PV buffering unit 201b is provided in the controller 201. This PV buffering unit 201b holds trend data having (m+1) pieces of PV information that the controller 201 employs in the MV calculation in respective samplings from the current sampling to the m samplings prior to this current sampling.

The sensor 102 transmits the trend data having (m+1) pieces of information held in the PV buffering unit 102a to the controller 201 via the network 300.

When the controller 201 cannot receive the PV being transmitted from the sensor 102 due to the packet loss, the controller 201 compensates for the PV by the PV complementary value provided by the PV complementing unit 202. In this case, this completed value is different from the true PV.

Next, an embodiment of a compensating operation of the MV compensating unit 201c will be explained hereunder. A manipulated variable $u_n$ (=MV) obtained when the controller 201 performs the PID operation on a deviation between PV and SV is given by Eq. (1).

$$u_n = K_P\left[e_n + \frac{\Delta t}{T_I}\sum_{i=1}^{n} e_i + \frac{T_D}{\Delta t}(e_n - e_{n-1})\right] \quad n = 1, 2, 3, \ldots \quad (1)$$

where $e_n$: deviation ($=r_n-x_n$)
$r_n$: SV
$x_n$: PV
$\Delta t$: sampling time
$K_p$: control gain
$T_I$: integration time
$T_n$: differentiation time The MV compensating unit 201c calculates a virtual SV value based on the trend data being answered back and the trend data being held on the controller 201 side such that an amount of manipulated variable obtained from the sampling at a time of occurrence of an error in the packet transmission to the current sampling coincides with the value of the trend data being answered back. Then, the MV compensating unit 201c corrects/calculates the MV in the controller 201 from this virtual SV value. This virtual SV value is given by Eq. (2).

$$r_{n-k} = \frac{\frac{u_{n-k}}{K_P} - \frac{\Delta t}{T_I}\sum_{i=1}^{n-k-1} e_i + \frac{T_D}{\Delta t}e_{n-k-1}}{1 + \frac{\Delta t}{T_I} + \frac{T_D}{\Delta t}} + x_{n-k} \quad (2)$$

Figure 2:
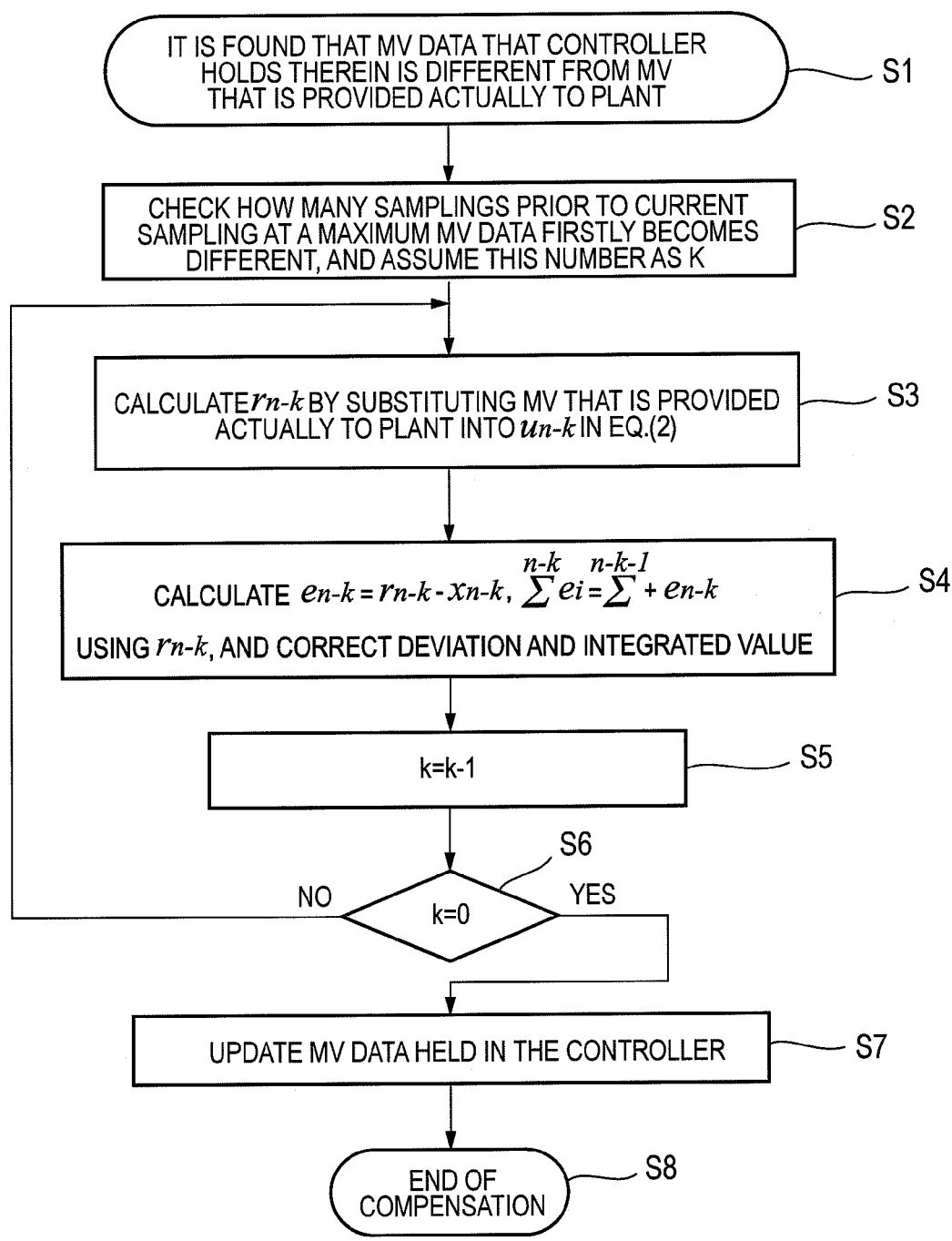
FIG. 2 is a flowchart showing procedures for compensating a calculation of a manipulated variable of a controller.

FIG. 2 is a flowchart showing procedures for compensating a calculation of the manipulated variable of the controller. In step S1, it is found that the MV calculated by the controller is different from the MV that is provided actually to the plant. Then, in step S2, it is checked how many samplings prior to the current sampling at a maximum the MV that the controller holds therein (the MV calculated by the controller or the MV updated by the compensating operation) firstly becomes different from the MV that is provided actually into the plant, and this sampling number is assumed as k.

Assuming that the current sampling is n, the compensating operation is started from the (n−k)-th sampling, in which the MV that the controller holds therein becomes different at first from the MV that is provided actually into the plant.

In step S3, the MV, which is provided actually into the plant in the (n−k)-th sampling as the compensated object sampling, is substituted into $u_{n-k}$ shown in Eq. (2), and thus a set value $r_{n-k}$ appropriate to the MV is calculated.

In step S4, the calculated $r_{n-k}$ is considered as the set value of the (n−k)-th sampling, and then a deviation in the (n−k)-th sampling and an integrated value up to the (n−k)-th sampling are calculated once again.

Then, in step S5, the similar operation is performed by applying k=k−1, i.e., by shifting the compensated object sampling to the next sampling. Then, in step S6, the similar operation is repeatedly performed until the deviation in the (n−k)-th sampling and the integrated value up to the (n−k)-th sampling are calculated (k=0).

In step S7, the MV that the controller holds therein is updated to the MV that is used for the compensation and is provided actually into the plant. In step S8, the compensating process is ended.

In FIG. 2, the controller 201 is directed to a position-type PID controller. The controller 201 is not limited to the position-type PID controller, and the controller 201 is also directed to a speed-type PID controller. In the speed-type PID controller, the controller 201 transmits a difference $\Delta u_n$ of the MV shown in Eq. (3) to the actuator 103.

$$\Delta u_n = K_P\left[(e_n - e_{n-1}) + \frac{\Delta t}{T_I}e_n + \frac{T_D}{\Delta t}(e_n + 2e_{n-1} + e_{n-2})\right] \quad n = 1, 2, 3, \ldots \quad (3)$$

When this difference $\Delta u_n$ is lost due to the packet loss, the actuator 103 makes up any $\Delta u_n$. For example, when the MV in the preceding sampling is maintained as it is, $\Delta u_n=0$.

Then, the difference applied to the MV being provided actually to the plant becomes different from the difference calculated by the controller, and thus the internal state of the controller gets out of order, likewise the position-type PID controller. Therefore, the compensation is performed similarly to the case of the position-type. A compensating equation is given by Eq. (4).

$$r_{n-k} = \frac{\frac{\Delta u_{n-k}}{K_P} + e_{n-k-1} + \frac{T_D}{\Delta t}(2e_{n-k-1} - e_{n-k-2})}{1 + \frac{\Delta t}{T_I} + \frac{T_D}{\Delta t}} + x_{n-k} \qquad (4)$$

Figure 3:
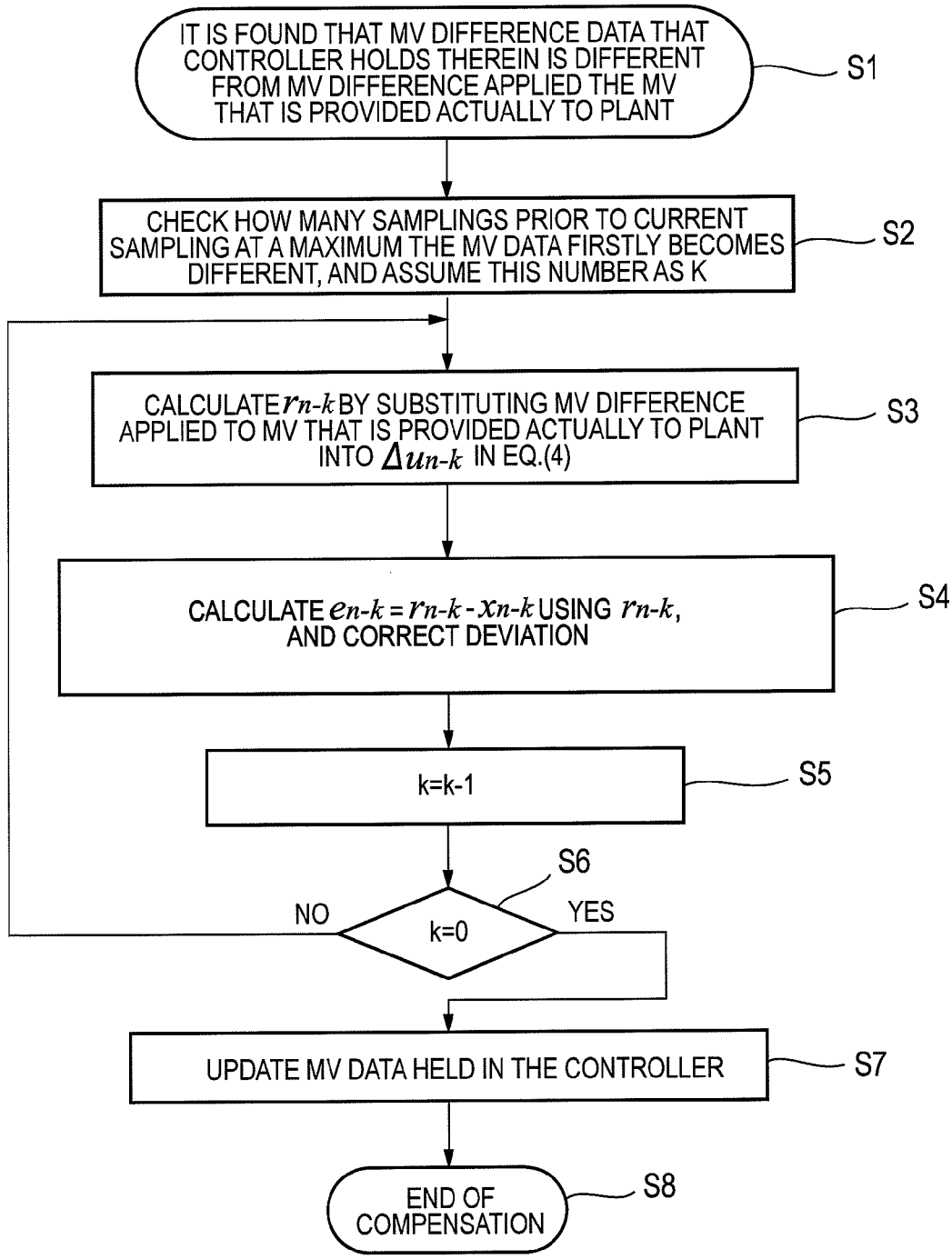
FIG. 3 is a flowchart showing other procedures for compensating a calculation of a manipulated variable of a controller.

FIG. 3 is a flowchart showing procedures for compensating the MV calculation in the speed-type PID controller. Steps S1 to S8 correspond to steps S1 to S8 in FIG. 2, respectively. In this compensation, likewise the position type, the disturbance of the internal state of the controller is resolved by replacing the cause of the difference between a difference of the MV calculated by the controller and a difference applied to the MV that is provided actually to the controlled object plant 101 with the cause of the SV difference, and thus a deterioration of the response is prevented.

In such an event that not the difference applied to the MV that is provided actually to the controlled object plant 101 but the MV that is provided actually into the controlled object plant 101 is obtained, the difference of MV may be calculated from this MV.

Here, in the case of the position type, the deviation and the integration are contained in Eq. (1), and therefore both the deviation and the integration are compensated. In the case of the speed type, the integration is not contained in Eq. (3), and therefore only the deviation is compensated. In the case of the speed type, it may be considered that, since the actuator 103 calculates the MV from the deviation of MV, the actuator 103 has substantially the integrated value.

The actuator 103 updates the state by using the difference, which is applied to the MV provided actually to the controlled object plant, in each of the samplings irrespective of the packet loss. No disorder is produced in the actuator 103.

Figure 10:
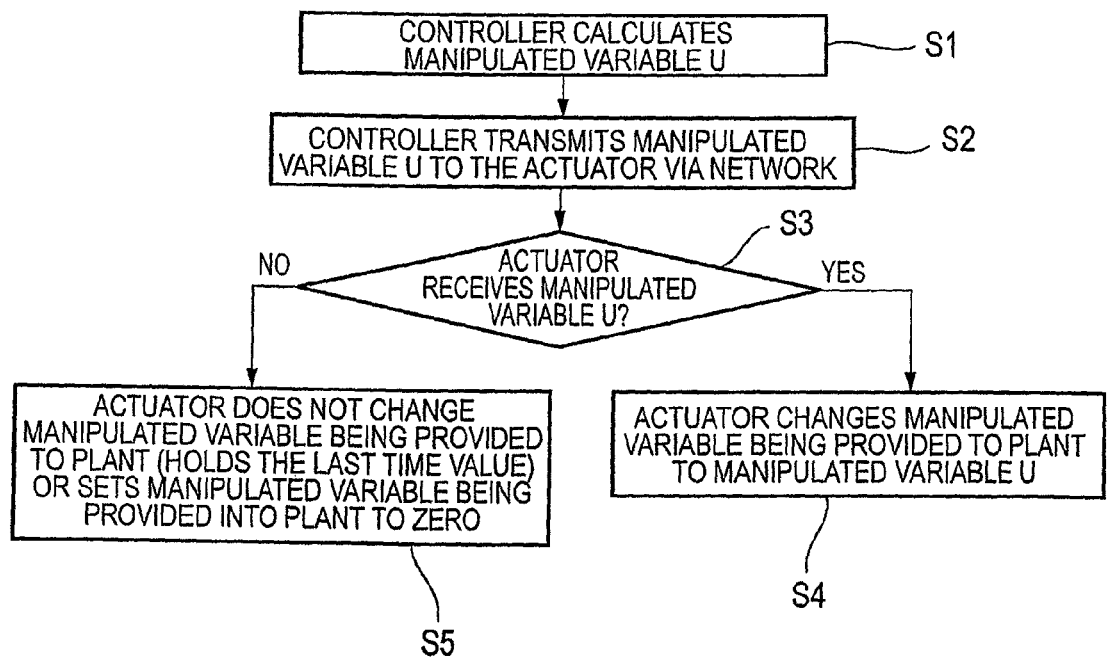
FIG. 10 is a flowchart showing procedures for setting an MV complementary value in the prior art.

Next, procedures for setting an MV complementary value in an MV complementing unit 104 will be explained hereunder. FIG. 10 is a flowchart showing procedures for setting an MV complementary value in the prior art. In step S1, the controller 201 calculates a manipulated variable U (=MV) in respective samplings. In step S2, the controller 201 transmits the manipulated variable U to the actuator 103 via the network.

In step S3, it is determined whether or not the actuator 103 could receive the manipulated variable U. If the actuator 103 could receive the manipulated variable U (Yes in step S3), this actuator 103 changes the manipulated variable provided to the controlled object plant 101 to the manipulated variable U in step S4. In contrast, if the actuator 103 could not receive the manipulated variable U due to the packet loss (No in step S3), this actuator 103 compensates for this manipulated variable by using any value, and provides this variable to the controlled object plant 101 in step S4.

As the way of compensating the value, there are two approaches. One approach is that the preceding value is held to maintain the manipulated variable provided currently to the controlled object plant 101 as it is (the second preceding value is held if the packet loss also occurs in the preceding sampling), and the other approach is that no value is provided to the controlled object plant 101 (the manipulated variable is set to zero) (step S5).

According to the approach of holding the preceding value, there is such a possibility that, for example, when the set value is changed, the manipulated variable has a very large value only in that sampling. At this time, when the packet loss occurs in the next sampling, this very large manipulated variable is held to disturb the response.

According to the approach of setting the manipulated variable to zero, the manipulated variable is suddenly set to zero in such a situation that any manipulated variable is provided to the plant up to now, which also disturbs the response.

Figure 4:
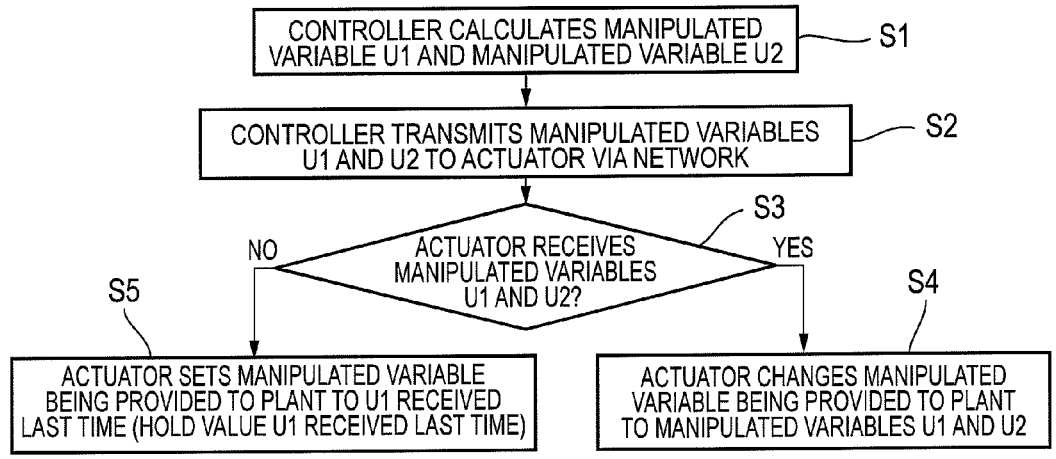
FIG. 4 is a flowchart showing procedures for setting an MV complementary value according to the present invention.

FIG. 4 is a flowchart showing procedures for setting an MV complementary value according to the present invention. In step S1, the controller 201 calculates the manipulated variable in respective samplings separately as following two values. One value is a first manipulated variable U1 corresponding to a value that is to be held next time, and the other value is a second manipulated variable U2 corresponding to a value except the value that is to be held next time. The manipulated variable U1 and U2 are given by Eq. (5) and Eq. (6).

$$U1_n = K_P\left[e_n + \frac{\Delta t}{T_I}\sum_{i=1}^{n} e_i - \frac{T_D}{\Delta t}(x_n - x_{n-1})\right] n = 1, 2, 3, \cdots \qquad (5)$$

$$U2_n = K_P \frac{T_D}{\Delta t}(r_n - r_{n-1}) \; n = 1, 2, 3, \cdots \qquad (6)$$

In step S2, the controller 201 transmits the manipulated variables U1 and U2 to the actuator 103 via the network 300. In step S3, it is determined whether or not the actuator 103 could receive the manipulated variables U1 and U2. If the actuator 103 could receive the manipulated variables U1 and U2 (Yes in step S3), this actuator 103 changes the manipulated variables to the manipulated variables U1 and U2 and provides the variables U1 and U2 to the controlled object plant 101 in step S4.

In contrast, if the actuator 103 could not receive the manipulated variables U1 and U2 due to the packet loss (No in step S3), the actuator 103 provides only the manipulated variable U1 out of the manipulated variables U1 and U2 being received last time (the values U1 and U2 being received before the last time if the packet loss occurs in the last time sampling) into the controlled object plant 101 in step S5.

In this manner, if an amount of SV change in the differentiating operation is assigned to the variable U2 and an amount of remaining changes is assigned to the variable U1, it is possible to resolve the problem that the slightly larger manipulated variable being output when the set value is changed is held, which is also the problem in the conventional approach. The reason is as follows. That is, such an event depends on an amount of SV change in the differentiating operation that, when the set value is changed, the slightly larger manipulated variable is output. Therefore, even when the packet loss occurs in the next sampling, an amount of SV change in the differentiating operation (the variable U2), which leads to the manipulated variable being increased when the set value is changed, is never provided to the controlled object plant 101.

Figure 5:
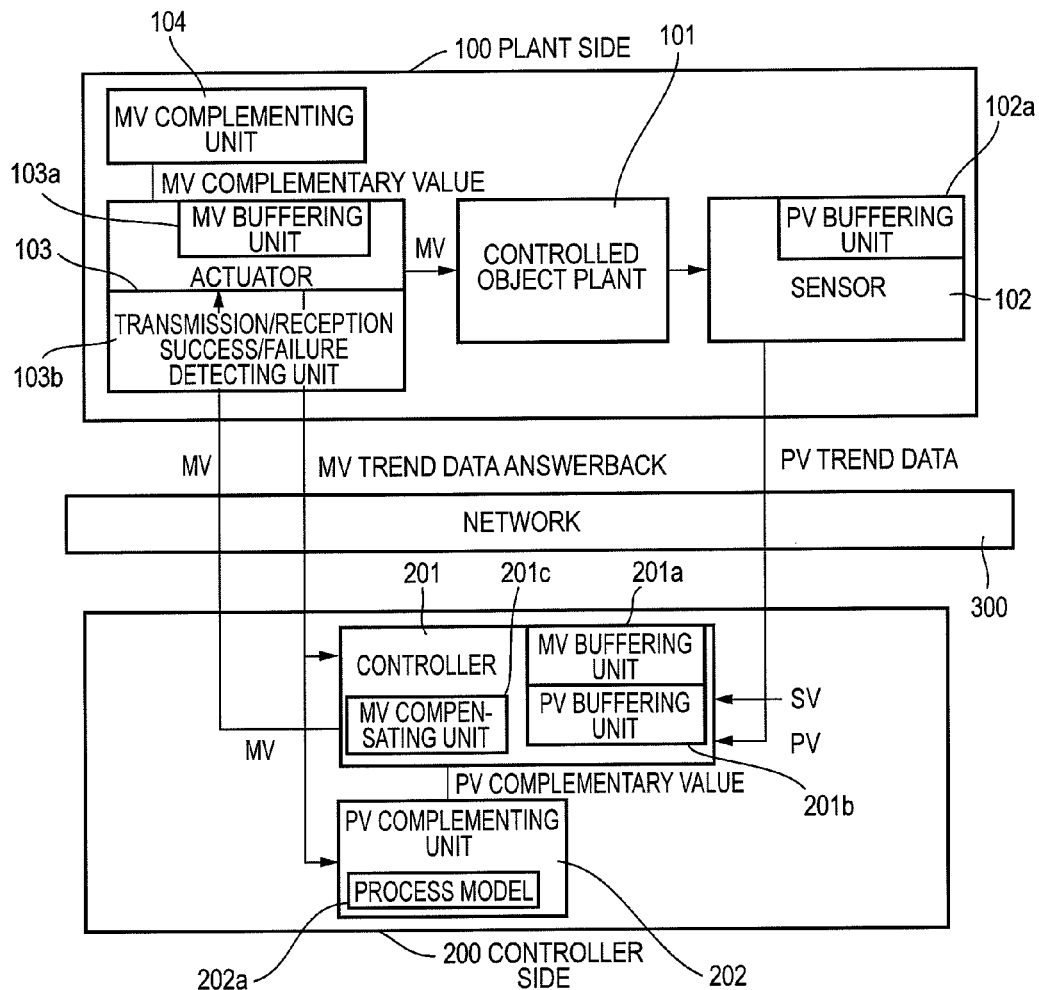
FIG. 5 is a functional block diagram showing another embodiment of a network control system according to the present invention.

FIG. 5 is a functional block diagram showing another embodiment of a network control system according to the present invention. The configuration of FIG. 5 is different from that of FIG. 1 in that a transmission/reception success/failure detecting unit 103b is added to the actuator 103.

The actuator 103 may be configured such that the actuator does not transmit the MV trend data having (m+1) pieces of information in each sampling but may transmit the data consisting of only the value that is compensated by the MV completer when the actuator 103 could not receive the MV due to the packet loss. As a result, an amount of information transmitted from the actuator 103 to the controller 201 can be decreased, and thus the communication load can be lessened.

In this case, the MV data that the actuator 103 holds in the MV buffering unit 103a only consists of the MV complementary value that is compensated by the MV complementing unit 104 when the actuator could not receive the MV. Hence, the actuator 103 stores the MV complementary value in the MV buffering unit 103a only when this actuator could not receive the MV.

Also, the actuator 103 transmits the MV complementary value in the MV buffering unit 103a to the controller 201 as the MV trend data answerback. In this case, the transmission/reception success/failure detecting unit 103 detects whether or not this transmission/reception succeeded, and the actuator 103 empties out the MV buffering unit 103a only when the actuator 103 can check that the MV data was transmitted without fail.

This is because the value becomes unnecessary once such value has reached the controller 201. According to this approach, the processes taken on the accumulator side are increased rather than the case where the actuator 103b transmits simply (m+1) pieces of the data. Therefore, the processing function is required to some extent of the actuator 103.

Further, the controller 201 can be provided with a function that stops temporarily the transmission of the MV to the actuator 103 until the controller 201 acquires the answer-back of the trend data or the complementary value from the actuator 103.

Figure 6:
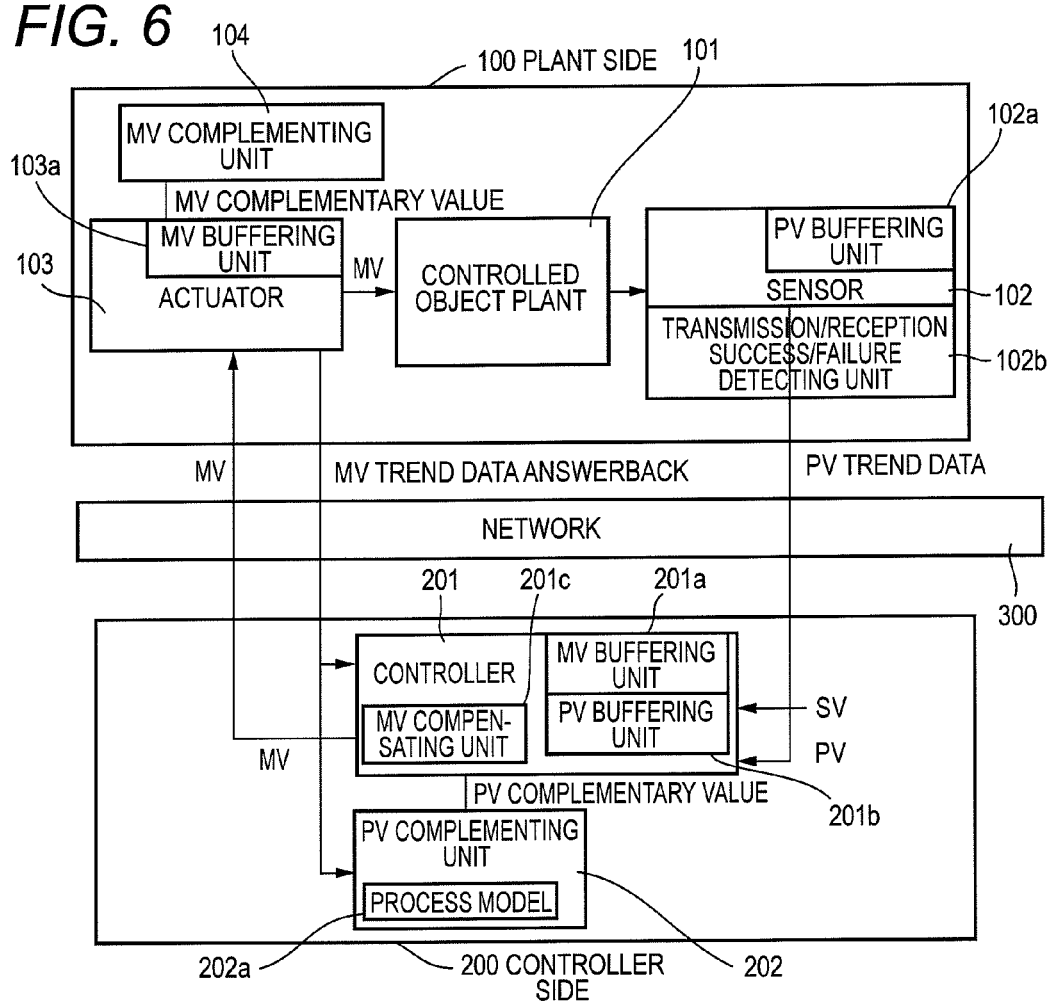
FIG. 6 is a functional block diagram showing still another embodiment of a network control system according to the present invention.

FIG. 6 is a functional block diagram showing still another embodiment of a network control system according to the present invention. The configuration of FIG. 6 is different from that of FIG. 1 in that a transmission/reception success/failure detecting unit 102b is added.

The sensor 102 may be configured such that the sensor does not transmit the PV trend data having (m+1) pieces of information in each of the samplings but may transmit the data consisting of only the latest PV and the PV that has not reached the controller before. As a result, an amount of information transmitted from the sensor 102 to the controller 201 can be decreased, and thus the communication load can be lessened.

In this case, the PV data that is held by the PV buffering unit 102a of the sensor 102 consists of only the latest PV and the PV that cannot be transmitted to the controller before. The sensor 102 transmits the data in the PV buffering unit 102a to the controller 201. In this event, the transmission/reception success/failure detecting unit 102b detects whether or not the transmission/reception is performed successfully, and the sensor 102 empties out the PV buffering unit 102a only when the sensor 102 checks that this sensor transmits the data without fail.

This is because the value is not needed once the value reaches the controller 201. According to this approach, the processes performed on the accumulator side are increased rather than the case where the sensor 102 transmits simply the (m+1) pieces of the data. Therefore, the processing function is required to some extent of the sensor 102.

Figure 7:
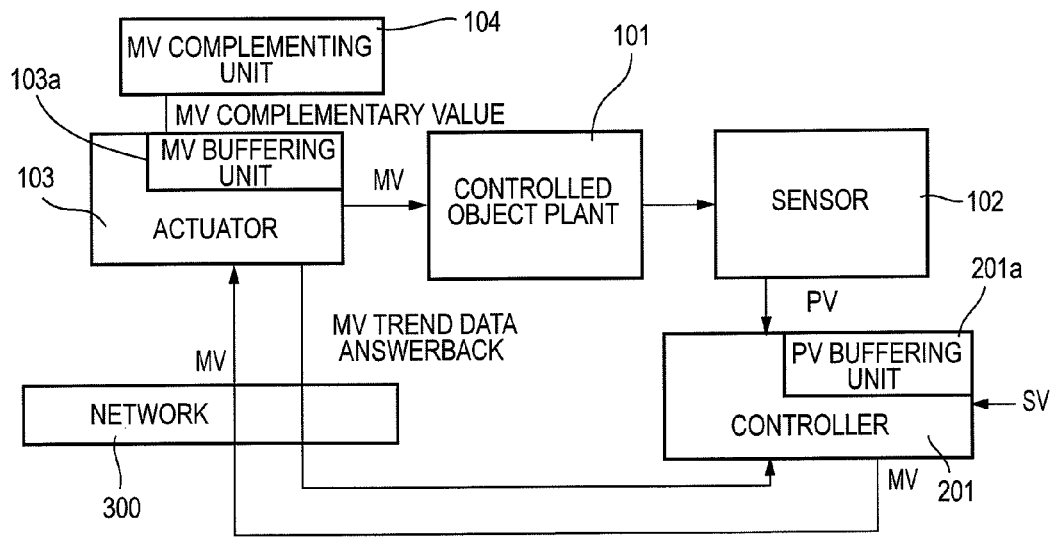
FIG. 7 is a functional block diagram showing yet another embodiment of a network control system according to the present invention.

FIG. 7 is a functional block diagram showing yet another embodiment of a network control system according to the present invention. This embodiment is characterized in that the controller 201 is integrated with the sensor 102 and only the information transmission between the controller 201 and the actuator 103 is performed via the network 300.

In this case, the packet loss of the PV never occurs. Therefore, the PV complementing unit, the PV buffering unit in the sensor 102, and the PV buffering unit in the controller 201 are not needed. Also, the information transmitted from the sensor 102 to the controller 201 is not the PV trend data but the latest PV only.

In order to obtain the PV complementary value from the PV complementing unit 202, the approach of calculating the value predicted based on the transition of PV trend data and then setting the PV complementary value is considered to be common. In this case, when a process model 202a is provided, the PV complementing unit 202 can correct the PV complementary value by predicting the PV from the MV trend data.

This application is based upon Japanese Patent Application No. 2007-280543, filed on Oct. 29, 2007; the contents of which are incorporated herein by reference.

The invention claimed is:

1. A network control system for packet-transmitting a manipulated variable ("MV") of a controller, which is calculated based on a deviation between a processed variable from a sensor that measures a physical quantity of a controlled object plant and a set value at a predetermined sampling period, to an actuator provided on a controlled object plant side via a network, and causing the actuator to provide the manipulated variable to the controlled object plant, the network control system comprising:

an MV complementing unit that provides a complementary value of the manipulated variable to the actuator when an error occurs in a packet transmission;

an MV buffering unit that answers back trend data of the manipulated variable being provided to the controlled object plant from the actuator or the complementary value being complemented by the MV complementing unit for the actuator, to the controller via the network; and an MV compensating unit that corrects a calculation of the manipulated variable of the controller based on the trend data or the complementary value being answered back, wherein the MV compensating unit calculates a virtual set value ("SV") based on the trend data or the complementary value being answered back and the trend data being held on the controller side, such that an amount of the manipulated variable obtained from a sampling at a time of occurrence of the error in the packet transmission to a current sampling coincides with a value of the trend data, and then corrects/calculates the manipulated variable in the controller from the virtual SV.

2. The network control system according to claim 1, wherein the controller stops temporarily the transmission of the manipulated variable to the actuator until the controller acquires an answer-back of the trend data or the complementary value.

3. The network control system according to claim 1, wherein when the processed variable measured by the sensor is packet-transmitted to the controller via the network, the network control system further comprises:

a processed variable ("PV") complementing unit that provides a complementary value of the processed variable to the controller when the error occurs in the packet transmission; and a PV buffering unit that transmits the trend data of the processed variable measured by the sensor to the controller via the network.

4. The network control system according to claim 3, wherein the PV complementing unit corrects the complementary value of the processes variable based on the trend data of the manipulated variable.

5. A network control system for packet-transmitting a manipulated variable ("MV") of a controller, which is calculated based on a deviation between a processed variable from a sensor that measures a physical quantity of a controlled object plant and a set value at a predetermined sampling period, to an actuator provided on a controlled object plant side via a network, and causing the actuator to provide the manipulated variable to the controlled object plant, the network control system comprising:
- an MV complementing unit that provides a complementary value of the manipulated variable to the actuator when an error occurs in a packet transmission;
- an MV buffering unit that answers back trend data of the manipulated variable being provided to the controlled object plant from the actuator or the complementary value being complemented by the MV complementing unit for the actuator, to the controller via the network; and
- an MV compensating unit that corrects a calculation of the manipulated variable of the controller based on the trend data or the complementary value being answered back, wherein the controller transmits separately a first manipulated variable corresponding to an amount of change in a set value in a differentiating operation and a second manipulated variable corresponding to an amount of change in the set value except the amount of change in the set value in the differentiating operation, and the MV complementing unit provides a sum of the first manipulated variable and the second manipulated variable to the actuator as the complementary value when the packet transmission is in a normal state, and provides only the second manipulated variable to the actuator as the complementary value when the packet transmission is in an error state.

* * * * *